United States Patent [19]

Brien

[11] Patent Number: 5,209,085
[45] Date of Patent: May 11, 1993

[54] CLUTCH/BRAKE DRIVE UNIT

[75] Inventor: Phillip M. Brien, Blaxland, Australia

[73] Assignee: Hoover (Australia) Pty. Limited, Australia

[21] Appl. No.: 888,400

[22] Filed: May 21, 1992

Related U.S. Application Data

[63] Continuation of Ser. No. 659,038, Feb. 21, 1991, abandoned.

[30] Foreign Application Priority Data

Feb. 23, 1990 [AU] Australia ............... PJ879671239/9

[51] Int. Cl.⁵ .............................................. D06F 37/40
[52] U.S. Cl. ..................................... 68/23.7; 192/18 B
[58] Field of Search ............ 68/23.7; 192/18 B, 12 D, 192/84 C

[56] References Cited

U.S. PATENT DOCUMENTS

| | | | |
|---|---|---|---|
| 2,645,110 | 7/1953 | Dayton | 68/23.7 |
| 2,720,955 | 10/1955 | Young | 68/23.7 X |
| 2,950,795 | 8/1960 | Fischer | 192/18 B |
| 3,076,349 | 2/1963 | Williams et al. | 68/23.7 X |
| 3,893,191 | 7/1975 | Gold et al. | 192/18 B |
| 4,250,983 | 2/1981 | Handke | 192/18 B |
| 4,505,366 | 3/1985 | Sangiorgi | 192/18 B |
| 4,643,282 | 2/1987 | Edl | 192/18 B |
| 4,712,660 | 12/1987 | Erndt et al. | 192/18 B |
| 4,878,568 | 11/1989 | Fossum | 192/18 B |

FOREIGN PATENT DOCUMENTS 0576954 11/1986 Australia .

Primary Examiner—Philip R. Coe
Attorney, Agent, or Firm—Ladas & Parry

[57] ABSTRACT

A washing machine including a clutch/brake drive unit, said drive unit comprising a frame, a driving member and a driven member mounted coaxially for independent relative rotation with respect to the frame, a clutch including a clutch disc and mutually opposed frictional engagement surfaces respectively associated with the driving member and the driven member, said clutch being selectively engageable to permit the transmission of torque between the driving member and the driven member, a brake including a brake disc and mutually opposed frictional braking surfaces respectively associated with the driven member and the frame, said brake being selectively engageable to retard rotation of the driven member with respect to the frame, and a solenoid disposed intermediate the clutch and the brake such that energisation of the solenoid causes the brake to be released and the clutch to be engaged, said washing machine further including a spin bowl connected with the driven member, and an agitator couplable with the driving member.

16 Claims, 2 Drawing Sheets

CLUTCH/BRAKE DRIVE UNIT

This is a continuation of copending application(s) Ser. No. 07/659,038 filed on Feb. 21, 1991, and now abandoned.

FIELD OF THE INVENTION

The present invention relates to a combination electro-mechanical clutch/brake drive assembly for use in washing machines.

DESCRIPTION OF RELATED ART

Agitator type washing machines generally comprise a spin bowl rotatably mounted within an outer containment drum supported by a frame. An agitator projects upwardly within the spin bowl and is mounted for oscillatory rotation. A reversible electric motor drives the spin bowl and the agitator in response to signals from a controller according to predetermined washing and spinning cycles in a manner well known to those skilled in the art.

In known machines, a clutch (usually a wrap spring clutch) acts in association with a brake (usually a band type brake) to effect the various agitation and spinning cycles. The clutch is usually disposed intermediate an output drive shaft and the spin bowl to effect a driving connection therebetween during the spin mode. However, in the agitation mode the clutch is usually disengaged and the motor is alternately driven in the forward and reverse directions to drive the agitator in a corresponding oscillatory cycle through a reduction gearbox. The brake acts to retard the spin bowl at the conclusion of each spinning cycle and to prevent rotation of the spin bowl during the agitation cycle.

However, known machines of this type require a relatively large number of moving components which are susceptible to wear and this adversely affects the overall reliability of the machine. Moreover, known devices occupy large amounts of space, are relatively complex in construction, inefficient, noisy in operation, and limited in applicability.

It is therefore an object of the present invention to provide an improved clutch/brake drive unit which will overcome or substantially ameliorate at least some of the above-mentioned shortcomings of the prior art.

SUMMARY OF THE INVENTION

Accordingly, in a first aspect, the invention provides a Washing Machine including a clutch/brake drive unit, said drive unit comprising a frame, a driving member and a driven member mounted coaxially for independent relative rotation with respect to the frame, a clutch including a clutch disc and mutually opposed frictional engagement surfaces respectively associated with the driving member and the driven member, said clutch being selectively engageable to permit the transmission of torque between the driving member and the driven member, a brake including a brake disc and mutually opposed frictional braking surfaces respectively associated with the driven member and the frame, said brake being selectively engageable to retard rotation of the driven member with respect to the frame, and a solenoid disposed intermediate the clutch and the brake such that energisation of the solenoid causes the brake to be released and the clutch to be engaged, said washing machine further including a spin bowl connected with the driven member, and an agitator couplable with the driving member.

Preferably, the washing machine is operable in a spin mode wherein the clutch is engaged to couple the spin bowl, the agitator, and the driving member directly with the brake disengaged, and in an agitate mode wherein the clutch is disengaged and the motor drives the agitator in an oscillatory cycle with the brake engaged to prevent simultaneous rotation of the spin bowl relative to the frame.

In the preferred embodiment, the spin mode corresponds to an energised condition of the solenoid and the agitate mode corresponds to a de-energised solenoid condition.

The annular solenoid preferably includes radially spaced apart concentric inner and outer poles having upper and lower outwardly depending annular pole surfaces respectively adjacent the brake and clutch discs.

Preferably, the drive unit further includes resilient bias means disposed intermediate the brake disc and the frame to urge the mutually opposed braking surfaces axially into frictional engagement when the solenoid is de-energised, to retard rotation of the driven member with respect to the frame. In the preferred configuration, energisation of the solenoid produces a magnetic field of sufficient strength to overcome the bias force and urge the brake disc axially towards abutting engagement with the upper solenoid pole surfaces, thereby releasing the brake.

Also in the preferred embodiment, the driving member is connected to a pulley disc and the driven member is integral with the clutch disc such that energisation of the solenoid causes the driving member to be urged axially into frictional engagement with the clutch disc to drivingly conjoin the pulley and the driven member. Resilient bias means may also be provided to urge the pulley disc away from the clutch disc when the solenoid is de-energised. It will be appreciated, however, that the driving member could also be directly connected to the output shaft of a motor, for example, without the need for an intermediate belt and pulley assembly.

The arrangement is preferably such that upon energisation of the solenoid, the pulley disc is urged upwardly (when viewing the drawings) into abutment with the clutch disc, to form a generally U-shaped magnetic flux path of increased strength bridging the lower surfaces of the inner and outer solenoid poles. The resultant magnetic force arising from the increase in magnetic flux is then sufficient to overcome the resilient bias force actuating the brake. The brake disc is consequently urged downwardly (as seen in the drawings) into abutting engagement with the upper solenoid pole surfaces, thereby releasing the brake and bridging the upper solenoid pole surfaces. This then completes a substantially closed magnetic flux path around the solenoid which reinforces the magnetic attraction between the clutch disc and the pulley. The clutch is thereby engaged more fully to permit increased torque to be transmitted between the driving and driven members.

The clutch disc, brake disc and solenoid poles are preferably formed from a ferromagnetic material having a high relative permittivity such as iron.

It should be appreciated that the invention also includes within its scope a washing machine including a clutch/brake drive unit, said drive unit comprising a frame, a driving member and a driven member mounted coaxially or independent relative rotation with respect to the frame, a clutch including a clutch disc and mutually opposed frictional engagement surfaces respectively associated with the driving member and the driven member, said clutch being selectively engageable to permit the transmission of torque between the driving member and the driven member, a brake including a brake disc and mutually opposed frictional braking surfaces respectively associated with the driven member and the frame, said brake being selectively engageable to retard rotation of the driven member with respect to the frame, and a solenoid disposed intermediate the clutch and the brake such that energisation of the solenoid causes the clutch to be released and the brake to be engaged, said washing machine further including a spin bowl connected with the driven member, and an agitator couplable with the driving member.

BRIEF DESCRIPTION OF THE DRAWINGS

A preferred embodiment of the invention will now be described, by way of example only, with reference to the accompanying drawings in which.

DESCRIPTION OF THE PREFERRED EMBODIMENT

Figures 1A, 1B:
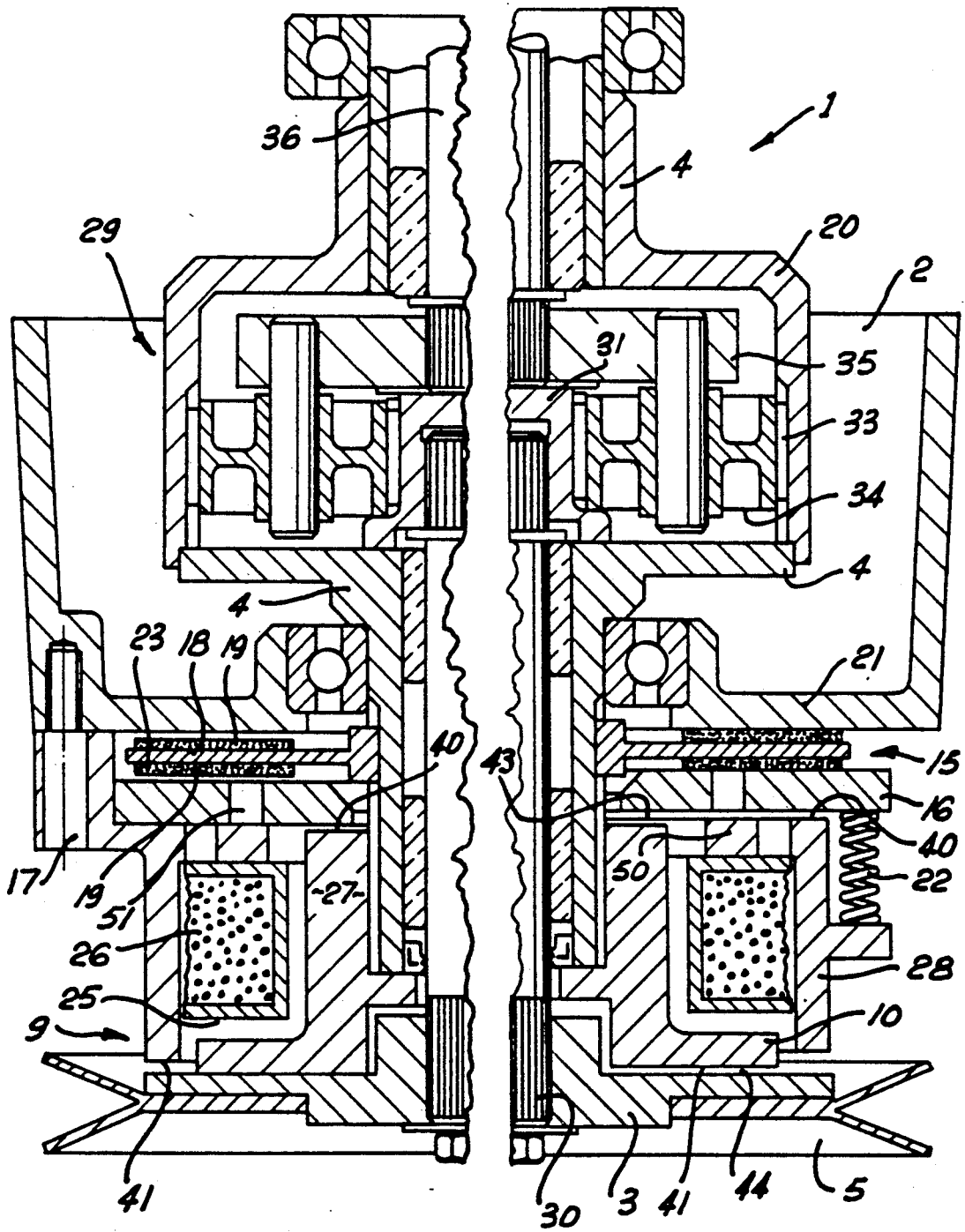
FIG. 1A is a sectional side elevation of a clutch/brake drive unit according to the invention showing the unit in the solenoid energised configuration.
FIG. 1B is a sectional side elevation of the clutch brake drive unit of FIG. 1A showing the unit in the solenoid de-energised configuration.
Figure 2:
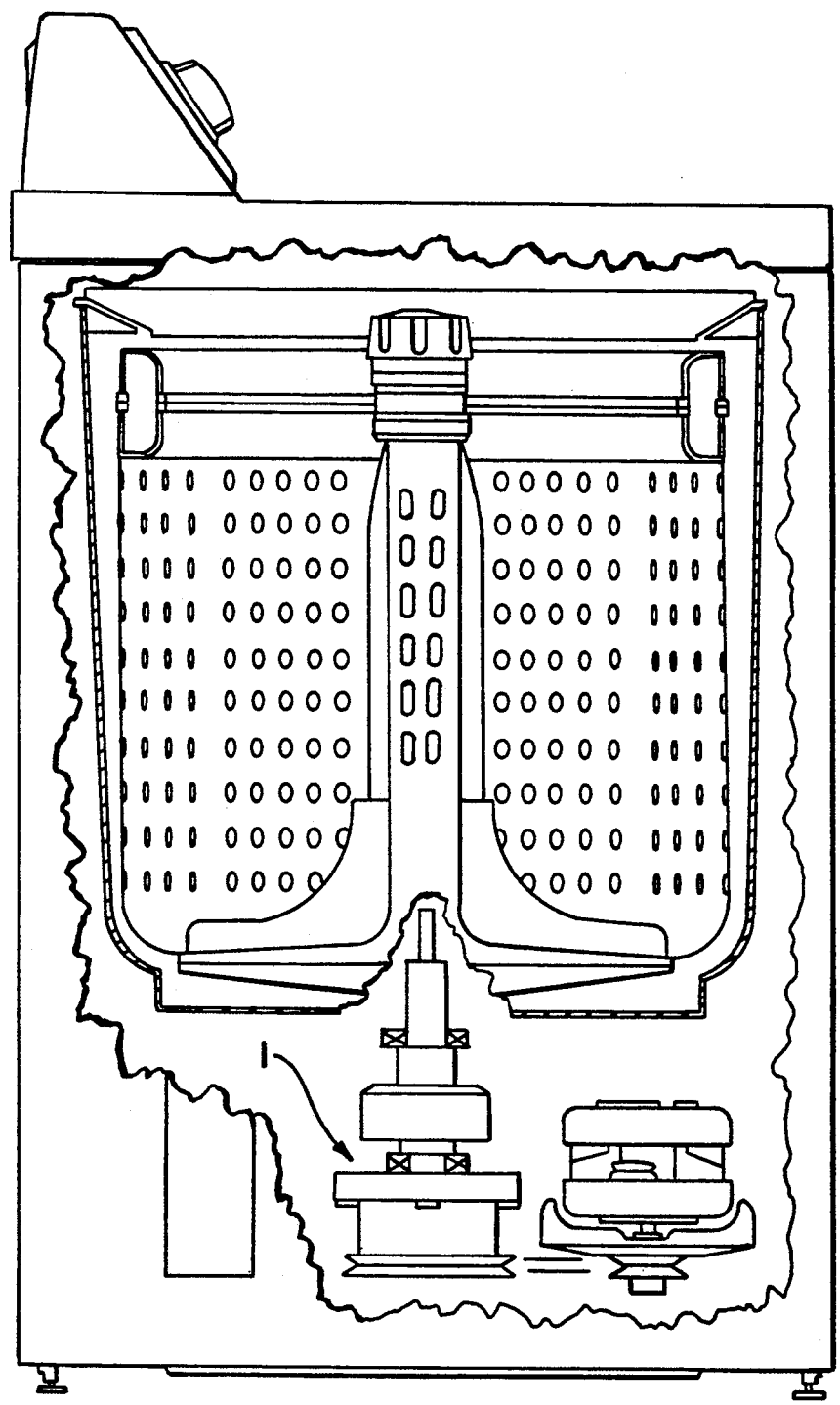
FIG. 2 is a sectional view of a washing machine incorporating the clutch/brake drive unit shown in FIGS. 1A and 1B.

Referring to the drawings, the invention provides a Machine incorporating a clutch/brake drive unit 1 comprising a frame 2, and a driving member 3 and driven member 4 mounted coaxially for independent relative rotation with respect to the frame. The driving member 3 comprises a pulley 5 adapted to be drivingly connected to the output shaft of a reversible electric drive motor (not shown) by means of an intermediate flexible V-belt. Alternatively, however, the driving member can be connected directly to the output shaft of the motor, in which case intermediate drive pulley 5 is not required. The drive unit further comprises a clutch disposed between driving member 3 and driven member 4 and a brake operable to retard rotation of the driven member with respect to the frame.

Clutch assembly 9 includes an annular clutch disc 10 connected to driven member 4. Clutch disc 10 and driving member 3 incorporate complementary mutually opposed frictional engagement surfaces whereby engagement of the clutch permits transmission of torque between driving member 3 and driven member 4.

Brake assembly 15 comprises an annular brake disc 16 mounted to frame 2 by means of keys 17 which prevent rotational movement but permit a limited range of axial sliding movement of the brake disc relative to the frame. An annular rotary carrier plate 18 keyed to driven member 4 and having outwardly depending frictional braking surfaces 19 is disposed between brake disc 16 and bearing cup 21, both of which are fixed with respect to the frame. Braking surfaces 19 can comprise any suitable frictional braking material and are preferably in the form of replaceable brake pads 23.

The drive unit further includes resilient bias means in the form of compression springs 22 effectively disposed intermediate the brake disc and the frame. Upon engagement, brake disc 16 is urged upwardly (when viewing the drawings) by compression springs 22, thereby tending to compress the rotating carrier plate 18 and urge outwardly depending braking surfaces 19 respectively into frictional engagement with the lower surface of bearing cup 21 and the upper surface of brake disc 16 to retard rotation of driven member 4 with respect to the frame. By incorporating the carrier plate into the drive unit to provide two frictional interfaces, a greater braking torque will be achieved for a given spring pressure in comparison with a system incorporating only a single frictional interface. It will be appreciated, however, that braking surfaces 19 need not necessarily be mounted to the carrier plate, but could alternatively be mounted to the bearing cup and brake disc respectively.

A torroidal solenoid 25 comprises circumferential windings 26, an inner rotating pole 27 connected to the driven member, and an outer stationary pole 28 connected to the frame. Inner and outer poles 27 and 28 are coaxially disposed intermediate clutch assembly 9 and brake assembly 15 such that energisation of solenoid 25 simultaneously causes the brake to be released and the clutch to be engaged in a manner more fully described below.

When incorporated into a conventional agitator type washing machine, driven member 4 is connected directly to the spin bowl (not shown) and gearbox housing 20. The driving member 3 incorporating pulley 5 is selectively couplable to the agitator (not shown) via reduction gearbox assembly 29. The input of gearbox 29 is connected to drive pulley 5 by means of central drive shaft 30 which supports sun gear 31 forming part of an epicyclic gear train incorporating ring gear 33, planet gears 34 and carrier 35. Ring gear 33 is mounted to the inner periphery of gearbox housing 20, forming part of the driven member. Planet gears 34 are supported by carrier 35 which in turn is splined to agitator shaft 36 to provide the appropriate reduction ratio which is typically of the order of 5 to 1. In one form of the invention, the central drive shaft 30 may be the output drive shaft of the electric motor.

Turning now to describe the operation of the clutch/brake drive unit in the washing machine, when the solenoid coil is de-energised, brake disc 16 is urged upwardly (as seen in the drawings) into braking engagement with carrier plate 18 by compression springs 22 whereby driven member 4, integral with the spin bowl, is held stationary with respect to the frame. When solenoid 25 is energised, the brake disc is urged downwardly toward upper surfaces 40 of inner and outer solenoid poles 27 and 28 with sufficient force to overcome the bias force of compression springs 22 and thereby release the brake.

Similarly, when the solenoid is energised, pulley disc 5 is attracted upwardly toward lower solenoid pole surfaces 41 and into driving engagement with clutch disc 10 with sufficient force to enable torque to be transmitted directly from the drive motor to the spin bowl. When the solenoid is de-energised, pulley 5 is disengaged from clutch disc 10 thereby decoupling the drive pulley from the spin bowl.

Thus, in spin mode, the solenoid is energised whereby the clutch couples the spin bowl, agitator and drive motor directly and the brake is disengaged. In agitate mode, the solenoid is de-energised whereby the clutch is disengaged and the motor drives the agitator in an oscillatory cycle indirectly through reduction gearbox 29 whilst the brake is engaged to hold the spin bowl stationary and transmit reaction torque from the gearbox to the frame.

Turning now specifically to describe the operation of the clutch, brake and solenoid in more detail, when solenoid 25 is initially energised, the magnetic flux is weak because of air gaps 43 and 44 (best seen in FIG. 1B) in the flux path adjacent respective upper 40 and lower 41 surfaces of the solenoid poles. However, the initial magnetic force from the energised solenoid is sufficiently strong to attract drive pulley 5 towards lower pole surfaces 41 and into abutting engagement with clutch disc 10. This engagement then substantially closes air gaps 44 to complete a generally U-shaped magnetic flux path of considerably increased strength, bridging the lower surfaces of the inner and outer solenoid poles.

The resultant magnetic force arising from the increased magnetic flux is then sufficient to overcome the opposing bias force from compression springs 22 and attract brake disc 16 downwardly into abutting engagement with the upper surfaces 40 of the inner and outer solenoid poles and thereby release the brake. Engagement of brake disc 16 with the inner and outer solenoid poles substantially closes air gaps 43 to complete a generally closed magnetic flux path encircling the torroidal solenoid thereby to reinforce the magnetic attraction between clutch disc 10 and drive pulley 5. This permits increased torque to be transmitted between the driving and driven members and thus allows the motor to drive the spin bowl.

The solenoid preferably also incorporates a plurality of spaced apart upwardly protruding intermediate pole portions 50 which correspond to slots 51 in brake disc 16. This configuration causes the magnetic flux to "zig-zag" across the air gap between the brake disc and the inner and outer poles. This magnifies the magnetic attraction between the brake disc and the solenoid for a given electrical energy input and thereby increases the electrical efficiency of the unit.

The clutch/brake drive unit according to the present invention requires fewer parts and affords simpler assembly and operation than comparable prior art devices, with consequential increases in reliability. Furthermore, solenoid operating noise is substantially reduced, as are the usual problems associated with conventional wrap spring clutch and brake band assemblies. Additionally, power consumption can be reduced and operating efficiency increased. The design may also be applied to reciprocating gearbox type washing machines.

It will be appreciated that whereas the clutch/brake drive unit of the preferred embodiment is operative upon energisation of the solenoid to release the brake and engage the clutch, it will be appreciated that an arrangement in which the effect of the operation of the solenoid is reversed, i.e. in which energisation of the solenoid engages the brake and releases the clutch, will also fall within the scope of the present invention.

Although the invention has been described with reference to specific examples, it will be appreciated by those skilled in the art that the invention may be embodied in many other forms.

I claim:

1. A washing machine including a clutch/brake drive unit, said drive unit comprising a frame, a driving member and a driven member mounted coaxially for independent relative rotation with respect to the frame, a clutch including a clutch disc and mutually opposed frictional engagement surfaces respectively associated with the driving member and the driven member, said clutch being selectively engageable to permit the transmission of torque between the driving member and the driven member, a brake including a brake disc and mutually opposed frictional braking surfaces respectively associated with the driven member and the frame, said brake being selectively engageable to retard rotation of the driven member with respect to the frame, and a solenoid disposed intermediate the clutch and the brake such that energization of the solenoid causes the brake to be released and the clutch to be engaged, said washing machine further including a spin bowl connected with the driven member, and an agitator couplable with the driving member.

2. A washing machine including a clutch/brake drive unit, said drive unit comprising a frame, a driving member and a driven member mounted coaxially for independent relative rotation with respect to the frame, a clutch including a clutch disc and mutually opposed frictional engagement surfaces respectively associated with the driving member and the driven member, said clutch being selectively engageable to permit the transmission of torque between the driving member and the driven member, a brake including a brake disc and mutually opposed frictional braking surfaces respectively associated with the driven member and the frame, said brake being selectively engageable to retard rotation of the driven member with respect to the frame, and a solenoid disposed intermediate the clutch and the brake such that energization of the solenoid causes the clutch to be released and the brake to be engaged, said washing machine further including a spin bowl connected with the driven member, and an agitator couplable with the driving member.

3. The washing machine according to claim 1 or claim 2 having a spin mode wherein the clutch is engaged to couple the spin bowl, the agitator, and the driving member directly with the brake disengaged, and having an agitate mode wherein the clutch is disengaged and the motor drives the agitator in an oscillatory cycle with the brake engaged to prevent simultaneous rotation of the spin bowl relative to the frame.

4. The washing machine according to claim 3, wherein the spin mode corresponds to an energized condition of the solenoid and the agitate mode corresponds to a de-energized solenoid condition.

5. The washing machine according to claim 1 or claim 2, wherein the solenoid includes radially spaced apart substantially concentric inner and outer poles having axially depending generally annular pole surfaces associated respectively with the brake and the clutch.

6. The washing machine according to claim 5 further including first resilient bias means disposed effectively intermediate the brake disc and the frame to urge the mutually opposed braking surfaces axially into frictional engagement when the solenoid is de-energized, thereby to retard rotation of the driven member with respect to the frame.

7. The washing machine according to claim 6, wherein energization of the solenoid produces a magnetic field of sufficient strength to overcome a biasing force of the first bias means and urge the brake disc axially toward the associated solenoid pole surfaces, thereby releasing the brake.

8. The washing machine according to claim 7 wherein the driving member is connected to a pulley and a driven member is effectively integral with the clutch disc such that energization of the solenoid causes the driving member to be urged axially into engagement with the clutch disc, thereby drivingly to conjoin the pulley with the driven member.

9. The washing machine according to claim 8 wherein energization of the solenoid causes the pulley to be urged axially into abutment with the clutch disc to form a magnetic flux path of generally U-shaped cross section and of increased relative strength bridging the solenoid pole surfaces, whereby a resultant magnetic force overcomes the biasing force to release the brake such that the associated solenoid pole surfaces are bridged by the brake disc, thereby to complete a substantially closed generally torroidal magnetic flux path around the solenoid increasing the torque transmissible through the clutch.

10. The washing machine according to claim 9, wherein the solenoid incorporates a plurality of spaced apart axially protruding intermediate pole portions and the brake disc incorporates a corresponding plurality of slots aligned respectively with the protruding pole portions to induce a generally sinuate magnetic flux path intermediate the solenoid poles and thereby enhance magnetic attraction between the brake disc and the solenoid for a given electrical energy input.

11. The washing machine according to claim 10, wherein said brake includes a rotatable carrier plate incorporating a pair of mutually opposed outwardly depending frictional braking surfaces defining a corresponding pair of frictional interfaces respectively adjacent the brake disc and the frame, and wherein said resilient bias means comprises a spring operable on the brake disc, the carrier plate being compressed between the brake disc and the frame upon de-energization of the solenoid to retard rotation of the driven member with respect to the frame.

12. The washing machine according to claim 1 or claim 2, wherein the clutch disc, brake disc and solenoid poles are formed from a ferromagnetic material.

13. The washing machine according to claim 12, wherein said ferromagnetic material is iron.

14. The washing machine according to claim 1 or 2, wherein the driving member is selectively coupled to the agitator via a reduction gear box assembly.

15. The washing machine according to claim 14 wherein the input of the gearbox is connected to the driving member by means of a central drive shaft supporting a sun gear forming part of an epicyclic gear train, said gear train further including a ring gear mounted to the inner periphery of a gear box housing forming part of the driven member, and a plurality of planet gears supported by a carrier connected to the agitator.

16. The washing machine according to claim 15, wherein said gear box provides a reduction ration of around 5 to 1.

* * * * *